(12) United States Patent
Murakawa et al.

(10) Patent No.: US 12,009,709 B2
(45) Date of Patent: Jun. 11, 2024

(54) ROTATING ELECTRICAL MACHINE, STATOR CORE AND ROTOR CORE SET, METHOD FOR MANUFACTURING ROTATING ELECTRICAL MACHINE, METHOD FOR MANUFACTURING NON-ORIENTED ELECTRICAL STEEL SHEET, METHOD FOR MANUFACTURING ROTOR AND STATOR OF ROTATING ELECTRICAL MACHINE, AND NON-ORIENTED ELECTRICAL STEEL SHEET SET

(71) Applicant: NIPPON STEEL CORPORATION, Tokyo (JP)

(72) Inventors: Tesshu Murakawa, Tokyo (JP); Yoshiaki Natori, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/038,949

(22) PCT Filed: Mar. 30, 2022

(86) PCT No.: PCT/JP2022/016234
§ 371 (c)(1),
(2) Date: May 25, 2023

(87) PCT Pub. No.: WO2022/210955
PCT Pub. Date: Oct. 6, 2022

(65) Prior Publication Data
US 2023/0353023 A1 Nov. 2, 2023

(30) Foreign Application Priority Data

Mar. 31, 2021 (JP) ................................ 2021-061734
Jun. 4, 2021 (JP) ................................ 2021-094801

(51) Int. Cl.
H02K 15/02 (2006.01)
C21D 9/46 (2006.01)
H02K 1/02 (2006.01)

(52) U.S. Cl.
CPC ............... *H02K 15/02* (2013.01); *C21D 9/46* (2013.01); *H02K 1/02* (2013.01); *H02K 2213/03* (2013.01)

(58) Field of Classification Search
None
See application file for complete search history.

(56) References Cited

U.S. PATENT DOCUMENTS

2013/0127280 A1* 5/2013 Sugimoto ............... H02K 1/02
 310/156.01
2017/0098498 A1 4/2017 Tada et al.
(Continued)

FOREIGN PATENT DOCUMENTS

JP 2001-192733 A 7/2001
JP 2001-192787 A 7/2001
(Continued)

*Primary Examiner* — Anthony M Liang
(74) *Attorney, Agent, or Firm* — Birch, Stewart, Kolasch & Birch, LLP

(57) ABSTRACT

A rotating electrical machine includes a stator, a rotor, and a casing that accommodates the stator and the rotor, in which a {111}<211> orientation intensity (A) of a core material of the stator is in a range of 2 to 30, a {111}<211> orientation intensity (B) of a core material of the rotor is in a range of 1 to 15, and both the orientation intensities satisfy a relationship of an expression (1) A>B.

3 Claims, 1 Drawing Sheet

(56) References Cited

U.S. PATENT DOCUMENTS

| 2019/0228891 A1 | 7/2019 | Natori et al. |
| 2021/0172036 A1 | 6/2021 | Kubota et al. |
| 2022/0186338 A1 | 6/2022 | Shimoyama et al. |

FOREIGN PATENT DOCUMENTS

| JP | 2006-199999 A | 8/2006 |
| JP | 2017-57462 A | 3/2017 |
| JP | 2017-222911 A | 12/2017 |
| JP | 2021-25097 A | 2/2021 |
| WO | WO 2015/199211 A1 | 12/2015 |
| WO | WO 2018/025941 A1 | 2/2018 |
| WO | WO 2018/167853 A1 | 9/2018 |
| WO | WO 2019/160092 A1 | 8/2019 |
| WO | WO 2020/217604 A1 | 10/2020 |

* cited by examiner

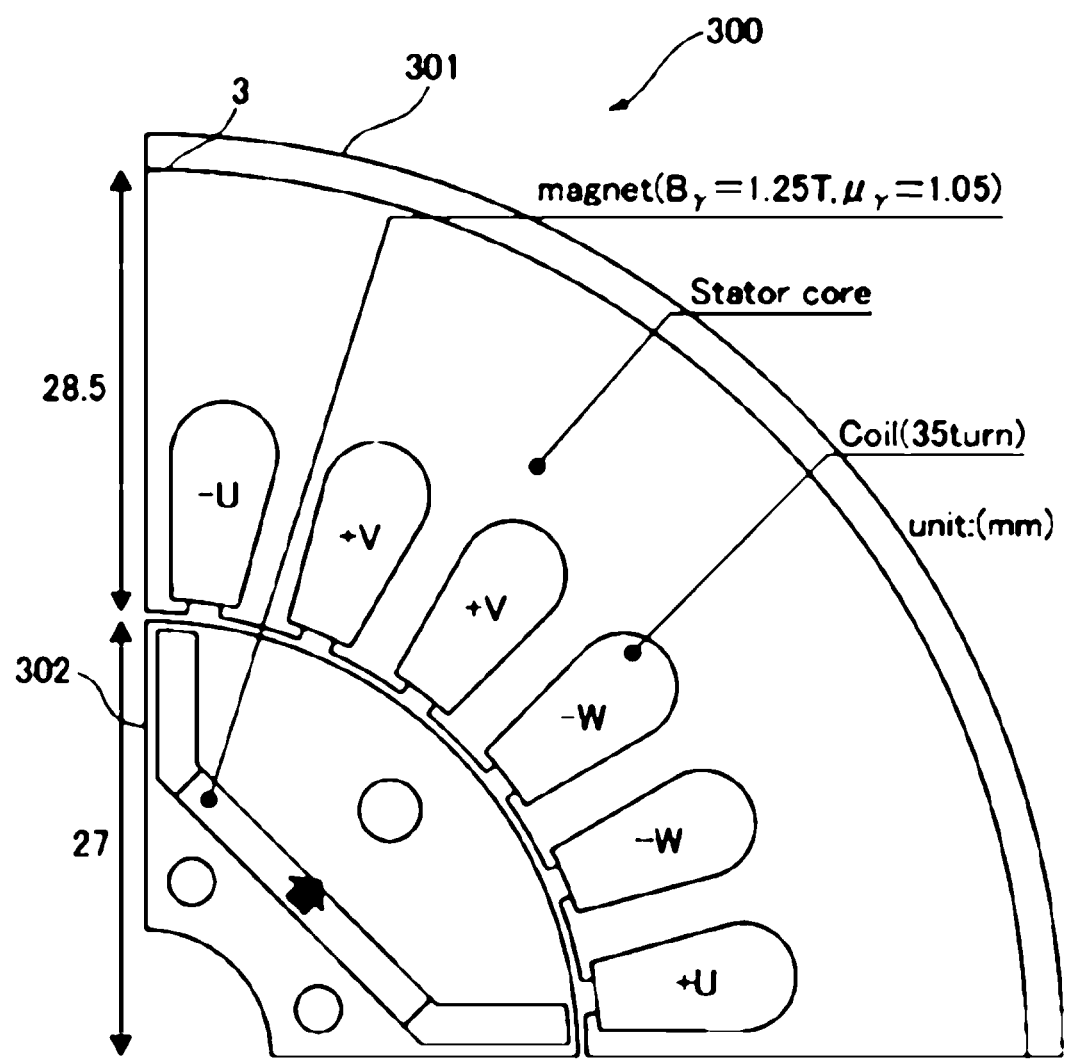

ly electrical machine, a stator core and rotor core set, a method for manufacturing a rotating electrical machine, a method for manufacturing a non-oriented electrical steel sheet, a method for manufacturing a rotor and a stator of a rotating electrical machine, and a non-oriented electrical steel sheet set.

ROTATING ELECTRICAL MACHINE, STATOR CORE AND ROTOR CORE SET, METHOD FOR MANUFACTURING ROTATING ELECTRICAL MACHINE, METHOD FOR MANUFACTURING NON-ORIENTED ELECTRICAL STEEL SHEET, METHOD FOR MANUFACTURING ROTOR AND STATOR OF ROTATING ELECTRICAL MACHINE, AND NON-ORIENTED ELECTRICAL STEEL SHEET SET

TECHNICAL FIELD OF THE INVENTION

The present invention relates to a rotating electrical machine, a stator core and rotor core set, a method for manufacturing a rotating electrical machine, a method for manufacturing a non-oriented electrical steel sheet, a method for manufacturing a rotor and a stator of a rotating electrical machine, and a non-oriented electrical steel sheet set.

This application claims the right of priority based on Japanese Patent Application No. 2021-061734 filed with the Japan Patent Office on Mar. 31, 2021 and Japanese Patent Application No. 2021-094801 filed with the Japan Patent Office on Jun. 4, 2021, the contents of which are incorporated herein by reference.

RELATED ART

A rotating electrical machine (motor) is composed of a stator, a rotor, and a casing. A stator core is formed by punching non-oriented electrical steel sheets into a predetermined shape, and then laminating the steel sheets and locking them with a clamp or the like. Then, after the stator core is subjected to a winding treatment, the casing is mounted by shrink-fitting or the like (refer to, for example, Patent Document 1). Further, in addition to the shrink-fitting, there are members such as cooling-fitting, press-fitting, and bolt fastening. However, all of them apply compressive stress to the stator core.

PRIOR ART DOCUMENT

Patent Document

[Patent Document 1] PCT International Publication No. WO2018/167853

DISCLOSURE OF THE INVENTION

Problems to be Solved by the Invention

Usually, the stator receives compressive stress from the casing, so that there is a problem in that the iron loss thereof easily increases. On the other hand, since the rotor transmits magnetic torque to the stator, there is a problem in that a material with high magnetic flux density is desired.

The crystal orientation of a non-oriented electrical steel sheet in which an iron loss does not easily increase due to compressive stress is a {111}<211> orientation. However, the magnetic flux density in the {111}<211> orientation tends to decrease. The inventors of the present invention have studied how to cause both the stator and the rotor to have good characteristics by using materials with different crystal orientations for the stator and the rotor.

In order to reduce sensitivity to compressive stress, it is preferable that a {111}<211> orientation intensity is high. However, if the {111}<211> orientation intensity is high, magnetic flux density decreases.

Therefore, an object of the present invention is to provide a technique for improving motor efficiency while causing both a stator and a rotor to have good magnetic characteristics, by increasing the {111}<211> orientation intensity of a stator material that receives compressive stress from a casing to increase sensitivity to the compressive stress, and decreasing the {111}<211> orientation intensity of a rotor material requiring high magnetic flux density to secure the magnetic flux density.

Means for Solving the Problem

The present invention has the following gist in order to solve the above problems.

(1) A rotating electrical machine includes: a stator; a rotor; and a casing that accommodates the stator and the rotor, in which a {111}<211> orientation intensity (A) of a core material of the stator is in a range of 2 to 30, a {111}<211> orientation intensity (B) of a core material of the rotor is in a range of 1 to 15, and both the orientation intensities satisfy a relationship of an expression (1) A>B.

(2) In the rotating electrical machine according to above (1), a {411}<148> orientation intensity (C) of the core material of the rotor is less than 4.

(3) In the rotating electrical machine according to the above (1) or (2), a chemical composition of each of a core of the stator and a core of the rotor includes, by mass %, C: 0.0100% or less, Si: 2.6% or more and 4.5% or less, Mn: 0.10% or more and 3.00% or less, P: 0.15% or less, S: 0.0030% or less, N: 0.0040% or less, Al: 0.10% or more and 2.00% or less, one or more selected from Sn and Sb: 0% to 0.200%, Cr: 0% to 5.0%, Ni: 0% to 5.0%, Cu: 0% to 5.0%, Ca: 0% to 0.010%, Mg: 0% to 0.0100%, a rare earth element (REM): 0% to 0.010%, Ti: 0.0030% or less, B: 0.0000% to 0.0050%, O: 0.0000% to 0.0200%, and a remainder consisting of Fe and impurities.

(4) A stator core and rotor core set that is used in the rotating electrical machine according to any one of the above (1) to (3).

(5) In the stator core and rotor core set according to the above (4), a chemical composition of each of a core of the stator and a core of the rotor includes, by mass %, C: 0.0100% or less, Si: 2.6% or more and 4.5% or less, Mn: 0.10% or more and 3.00% or less, P: 0.15% or less, S: 0.0030% or less, N: 0.0040% or less, Al: 0.10% or more and 2.00% or less, one or more selected from Sn and Sb: 0% to 0.200%, Cr: 0% to 5.0%, Ni: 0% to 5.0%, Cu: 0% to 5.0%, Ca: 0% to 0.010%, Mg: 0% to 0.0100%, a rare earth element (REM): 0% to 0.010%, Ti: 0.0030% or less, B: 0.0000% to 0.0050%, O: 0.0000% to 0.0200%, and a remainder consisting of Fe and impurities.

(6) A method for manufacturing a rotating electrical machine including manufacturing a rotating electrical machine by using the stator core and rotor core set according to the above (4) or (5).

(7) A method for manufacturing a non-oriented electrical steel sheet for a rotor core and a non-oriented electrical steel sheet for a stator core of the rotating electrical machine according to the above (1), in which when a non-oriented electrical steel sheet in which a chemical composition includes, by mass %, C: 0.0100% or less, Si: 2.6% or more and 4.5% or less, Mn: 0.10% or more and 3.00% or less, P: 0.15% or less, S: 0.0030% or less, N: 0.0040% or less, Al: 0.10% or more and 2.00% or less, one or more selected from Sn and Sb: 0% to 0.200%, Cr: 0% to 5.0%, Ni: 0% to 5.0%, Cu: 0% to 5.0%, Ca: 0% to 0.010%, Mg: 0% to 0.0100%, a rare earth element (REM): 0% to 0.010%, Ti: 0.0030% or less, B: 0.0000% to 0.0050%, O: 0.0000% to 0.0200%, and a remainder consisting of Fe and impurities is manufactured by processes that include steelmaking, hot rolling, hot-rolled sheet annealing, pickling, cold rolling, and finish annealing, two types of annealing temperatures for the hot-rolled sheet annealing are set, and a hot-rolled sheet annealing temperature of the non-oriented electrical steel sheet for the rotor core is set to a temperature in a range of 860° C. to 1000° C., which is higher than a hot-rolled sheet annealing temperature of the non-oriented electrical steel sheet for the stator core.

(8) A method for manufacturing a rotor and a stator of the rotating electrical machine according to the above (1), includes: manufacturing a non-oriented electrical steel sheet in which a chemical composition includes, by mass %, C: 0.0100% or less, Si: 2.6% or more and 4.5% or less, Mn: 0.10% or more and 3.00% or less, P: 0.15% or less, S: 0.0030% or less, N: 0.0040% or less, Al: 0.10% or more and 2.00% or less, one or more selected from Sn and Sb: 0% to 0.200%, Cr: 0% to 5.0%, Ni: 0% to 5.0%, Cu: 0% to 5.0% , Ca: 0% to 0.010%, Mg: 0% to 0.0100%, a rare earth element (REM): 0% to 0.010%, Ti: 0.0030% or less, B: 0.0000% to 0.0050%, O: 0.0000% to 0.0200%, and a remainder consisting of Fe and impurities, by processes that include steelmaking, hot rolling, hot-rolled sheet annealing, pickling, cold rolling, and finish annealing; punching out a core material that is used for the stator core and a core material that is used for the rotor from the obtained non-oriented electrical steel sheet and then stacking the core materials; and performing stress relief annealing only on the stator such that the above expression (1) is satisfied.

(9) In the method for manufacturing a non-oriented electrical steel sheet for a rotor core and a non-oriented electrical steel sheet for a stator core of the rotating electrical machine according to the above (7), the chemical composition of the non-oriented electrical steel sheet includes, by mass %, Cr: 0.001 to 5.000%.

(10) In the method for manufacturing a rotor and a stator of the rotating electrical machine according to the above (8), the chemical composition of the non-oriented electrical steel sheet includes, by mass %, Cr: 0.001 to 5.000%.

(11) A non-oriented electrical steel sheet set that is used for a core material of a rotating electrical machine, in which a $\{111\}<211>$ orientation intensity (A) of a non-oriented electrical steel sheet for a stator is in a range of 2 to 30, a $\{111\}<211>$ orientation intensity (B) of a non-oriented electrical steel sheet for a rotor is in a range of 1 to 15, and both the orientation intensities satisfy a relationship of an expression (1) A>B.

(12) In the non-oriented electrical steel sheet set according to the above (11), a chemical composition of each of the non-oriented electrical steel sheet for the stator and the non-oriented electrical steel sheet for the rotor includes, by mass%, C: 0.0100% or less, Si: 2.6% or more and 4.5% or less, Mn: 0.10% or more and 3.00% or less, P: 0.15% or less, S: 0.0030% or less, N: 0.0040% or less, Al: 0.10% or more and 2.00% or less, one or more selected from Sn and Sb: 0% to 0.200%, Cr: 0% to 5.0%, Ni: 0% to 5.0%, Cu: 0% to 5.0%, Ca: 0% to 0.010%, Mg: 0% to 0.0100%, a rare earth element (REM): 0% to 0.010%, Ti: 0.0030% or less, B: 0.0000% to 0.0050%, O: 0.0000% to 0.0200%, and a remainder consisting of Fe and impurities.

Effects of the Invention

In the present invention, both the stator and the rotor can have good magnetic characteristics, so that the motor efficiency can be improved.

BRIEF DESCRIPTION OF THE DRAWINGS

FIG. 1 is a partial plan view of a rotating electrical machine that is used in examples.

EMBODIMENTS OF THE INVENTION

Hereinafter, preferred embodiments of the present invention will be described in detail. Unless otherwise specified, the expression "a to b" for numerical values a and b means "a or more and b or less". In such an expression, in a case where a unit is attached only to the numerical value b, the unit is also applied to the numerical value a.

A first embodiment of the present invention is a rotating electrical machine having the following configuration.

The rotating electrical machine includes a stator, a rotor, and a casing that accommodates the stator and the rotor, in which a $\{111\}<211>$ orientation intensity (A) of a core material of the stator is in a range of 2 to 30, a $\{111\}<211>$ orientation intensity (B) of a core material of the rotor is in a range of 1 to 15, and both the orientation intensities satisfy a relationship of an expression (1) A>B.

Further, the first embodiment of the present invention also includes a stator core and rotor core set that is used in the rotating electrical machine.

Further, the first embodiment of the present invention includes a method for manufacturing a rotating electrical machine by using the stator core and rotor core set.

Hereinafter, the rotating electrical machine according to the present embodiment will be specifically described.

The rotating electrical machine of the present invention has at least a stator, a rotor, and a casing that accommodates the stator and the rotor. The stator, the rotor, and the casing are not particularly limited with respect to the shapes and configurations thereof, except for configurations described later (for example, the $\{111\}<211>$ orientation intensity), and have ordinary shapes and configurations.

The core material of the stator according to the present invention has a $\{111\}<211>$ orientation intensity (A) in a range of 2 to 30, the core material of the rotor has a $\{111\}<211>$ orientation intensity (B) in a range of 1 to 15, and both the $\{111\}<211>$ orientation intensities satisfy the relationship of the expression (1) A>B.

In the measurement of the $\{111\}<211>$ orientation intensity in the present invention, first, a plurality of core materials stacked as a stator core and a rotor core are separated into one sheet. Next, one of the core materials is polished such that the center of a plate thickness is exposed, and the polished surface is observed with respect to a region of 2500 $\mu m^2$ or more by EBSD (Electron Back Scattering Diffraction). The observations may be performed at several locations divided into several subdivisions as long as the total area is 2500 μm² or more. In the stator core, it is desirable to perform observation on a region of 2,500,000 μm² or more. A step interval during the measurement is set to 1 μm. The {111}<211> orientation intensity is obtained from the EBSD observation data. As the unit of the orientation intensity, a counter-random ratio (I/IO) is used.

The {111}<211> orientation intensity (A) of the core material of the stator is in the range of 2 to 30. If the {111}<211> orientation intensity (A) of the core material of the stator is less than 2, the increase amount of an iron loss increases with respect to compressive stress, and a motor loss increases. Further, if it exceeds 30, the crystal orientation itself aggravates the iron loss, and the motor loss increases. The {111}<211> orientation intensity (A) is preferably in a range of 4 to 10.

The {111}<211> orientation intensity (B) of the core material of the rotor is in the range of 1 to 15. If the {111}<211> orientation intensity (B) of the core material of the rotor is less than 1, the anisotropy of the material becomes strong, and when the shape of the rotor is punched out, the circularity deteriorates, and the motor loss increases, and if it exceeds 15, the magnetic flux density decreases and the motor loss increases. The {111}<211> orientation intensity (B) is preferably in a range of 2 to 8.

Each of the core materials of the stator and the rotor according to the present invention has the {111}<211> orientation intensity ranges described above, and both the {111}<211> orientation intensities need to satisfy the relationship of the expression (1) A>B. In a case where both the {111}<211> orientation intensities are in the relationship of A>B, since the {111}<211> orientation intensity (A) of the core material of the stator is larger than the {111}<211> orientation intensity (B) of the core material of the rotor, the magnetic characteristics of both the stator and the rotor are improved, so that the motor efficiency can be increased.

Conversely, in a case where both the {111}<211> orientation intensities are, in the relationship of A≤B, in the stator, the iron loss increases due to compressive stress by the case, and the magnetic flux density, of the rotor decreases, so that the efficiency of the rotating electrical machine cannot be improved.

Further, the {411}<148> orientation intensity (C) of the core material of the rotor is preferably less than 4. In this case, when the shape of the rotor is punched out, the effect of further improving the circularity can be obtained. The orientation intensity (C) can be measured by the method (EBSD) for measuring the orientation intensity (A) and the orientation intensity (B) described above.

A chemical composition of the non-oriented electrical steel sheet that can be used for the stator and rotor of the rotating electrical machine of the first embodiment is not particularly limited as long as it can provide the relationship of the expression (1) for the {111}<211> orientation intensities. Examples of suitable chemical compositions of the non-oriented electrical steel sheet of the present invention are shown below. "%" in the description of the chemical composition shall mean "mass %".

For example, it is preferable that the chemical composition of the non-oriented electrical steel sheet includes, by mass %, C: 0.0100% or less, Si: 2.6% or more and 4.5% or less, Mn: 0.10% or more and 3.00% or less, P: 0.15% or less, S: 0.0030% or less, N: 0.0040% or less, Al: 0.10% or more and 2.00% or less, one or more selected from Sn and Sb: 0% to 0.200%, Cr: 0% to 5.0%, Ni: 0% to 5.0%, Cu: 0% to 5.0%, Ca: 0% to 0.010%, Mg: 0% to 0.0100%, a rare earth element (REM): 0% to 0.010%, Ti: 0.0030% or less, and a remainder consisting of Fe and impurities.

C: 0.0100% or less

C is contained as an impurity. In order to reduce the iron loss, the content is set to preferably 0.0100% or less. The upper limit is more preferably 0.0025%, and further preferably 0.0020%.

Si: 2.6% or more and 4.5% or less

Si is an element that increases the strength of the steel sheet. Further, it is an element that increases the specific resistance and is contained to reduce the iron loss. Further, it is also effective in improving the strength of the steel sheet. From the viewpoint of this effect and prevention of a decrease in saturation magnetic flux density or embrittlement of steel, the content is set to preferably in a range of 2.5 to 4.5%. The lower limit is more preferably 2.8%, and further preferably 3.0%. The upper limit is more preferably 4.2%, and further preferably 4.0%.

Mn: 0.10% or more and 3.00% or less

Mn has the action of increasing the specific resistance, like Si and Al, and is contained to reduce the iron, loss. Further, it is also an element that increases the strength of the steel sheet. From the viewpoint of this effect and prevention of a decrease in saturation magnetic flux density or embrittlement of steel, the content is set to preferably in a range of 0.20 to 3.00%. The lower limit is more preferably 0.30%, and further preferably 0.60%. The upper limit is more preferably 2.8%, and further preferably 2.5%.

P: 0.15% or less

P is an element that improves the strength of the steel sheet. Since the strength of the steel sheet can also be improved with Si or Mn, P does not need to be contained. From the viewpoint of preventing embrittlement of the steel sheet, the content is set to preferably 0.15% or less. The upper limit is more preferably 0.08%, and further preferably 0.06%.

S: 0.0030% or less

S is an impurity. In order to reduce the iron loss, the content is set to preferably 0.0030% or less. The upper limit is more preferably 0.0025%, and further preferably 0.0020%.

N: 0.0040% or less

Nitrogen (N) is an impurity. N decreases the magnetic characteristic after additional heat treatment. Therefore, the N content is set to preferably 0.0040% or less. The N content is more preferably 0.0020% or less.

Al: 0.10% or more and 2.00% or less

Al is an element that increases the specific resistance, like Si, and is contained to reduce the iron loss. When Al is less than 0.10%, since this effect cannot be sufficiently obtained, the lower limit is set to 0.10%. The lower limit is more preferably 0.15%, and further preferably 0.20%. From the viewpoint of preventing a decrease in saturation magnetic flux density the content is set to preferably 2.0% or less. The upper limit is more preferably 1.8%, and further preferably 1.5%.

One or more selected from Sn and Sb: 0% to 0.200%

Sn is an element that develops a preferred crystal orientation for the magnetic characteristic. Sn does not need to be contained and the lower limit of the content is 0%. Although the effect of containing Sn can be obtained even in a trace amount, the content is set to preferably 0.01% or more, and more preferably 0.02% or more, in order to reliably obtain the effect of containing Sn. From the viewpoint of preventing deterioration in magnetic characteristic, the upper limit of the content is set to preferably 0.200%, and more preferably 0.100%.

Sb is an element that develops a preferred crystal orientation for the magnetic characteristic. Sb does not need to be contained and the lower limit of the content is 0%. Although the effect of containing Sb can be obtained even in a trace amount, the content is set to preferably 0.01% or more, and more preferably 0.02% or more, in order to reliably obtain the effect of containing Sb. From the viewpoint of preventing deterioration in magnetic characteristic, the upper limit of the content is set to preferably 0.200%, and more preferably 0.100%.

Cr: 0% to 5.0%

Cr is an element that improves corrosion resistance, a high-frequency characteristic, and a texture. Cr does not need to be contained, and the lower limit of the content is 0%. Although the effect of containing Cr can be obtained even in a trace amount, the content is set to preferably 0.001% or more, more preferably 0.01% or more, and further preferably 0.02% or more, in order to reliably obtain the effect of containing Cr. From the viewpoint of product cost, the upper limit of the content is 5.0%, preferably 0.5%, and more preferably 0.4%.

Ni: 0% to 5.0%

Ni is an element that increases the electric resistance of the steel sheet and reduces the iron loss. Ni does not need to be contained, and the lower limit of the content is 0%. Although the effect of containing Ni can be obtained even in a trace amount, the content is set to preferably 0.01% or more, and more preferably 0.02% or more, in order to reliably obtain the effect of containing Ni. From the viewpoint of product cost, the upper limit of the content is 5.0%, preferably 0.5%, and more preferably 0.4%.

Cu: 0% to 5.0%

Cu is an element that increases the electric resistance of the steel sheet and reduces the iron loss. Cu does not need to be contained. and the lower limit of the content is 0%. Although the effect of containing Cu can be obtained even in a trace amount, the content is set to preferably 0.01% or more and more preferably 0.02% or more, in order to reliably obtain the effect of containing Cu. From the viewpoint of product cost and prevention of embrittlement of steel, the upper limit of the content is 5.0%, preferably 0.5%, and more preferably 0.4%.

Ca: 0% to 0.010%

Ca is an element that coarsens sulfides, improves growth of crystal grains in a heat treatment step, and contributes to a decrease in iron loss. Ca does not need to be contained, and the lower limit of the content is 0%. Although the effect of containing Ca can be obtained even in a trace amount, the content is set to preferably 0.005% or more, and more preferably 0.0010% or more, in order to reliably obtain the effect of containing Ca. From the viewpoint of preventing deterioration in magnetic characteristic, the upper limit of the content is 0.010%, preferably 0.0050%, and more preferably 0.0030%.

Mg: 0% to 0.0100%

Mg is an element that reduces the iron loss through the action of promoting the growth of crystal grains, and is an element that converts sulfides in inclusions into harder inclusions containing Mg, thereby improving fatigue strength. In order to obtain this effect, the content is set to preferably 0.0000 to 0.0100% in consideration of cost. The lower limit is more preferably 0.0005%, and further preferably 0.0010%. The upper limit is more preferably 0.0040%, and further preferably 0.0030%.

Rare earth element (REM): 0% to 0.010%

A rare earth element (REM) is an element that coarsens sulfides, improves growth of crystal grains in a heat treatment step, and contributes to a decrease in iron loss. The rare earth element (REM) does not need to be contained, and the lower limit of the content is 0%. Although the effect of containing the rare earth element (REM) can be obtained even in a trace amount, the content is set to preferably 0.0005% or more, and more preferably 0.0010% or more, in order to reliably obtain the effect of containing the rare earth element (REM). From the viewpoint of preventing deterioration in magnetic characteristic, the upper limit of the content is 0.010%, preferably 0.0050%, and more preferably 0.0030%.

Ti: 0.0030% or less

Ti is an element that is contained as an impurity. Ti combines with C, N, O, or the like in base metal to form fine precipitates such as TiN, TiC, or Ti oxides, and inhibits the growth of crystal grains during annealing to deteriorate the magnetic characteristic, and therefore, the content is set to preferably 0.0030% or less. The upper limit is more preferably 0.0020%, and further preferably 0.0010%. Since Ti does not need to be contained, the lower limit of the content is 0%. The lower limit may be set to 0.0003% or 0.0005% in consideration of refining cost.

B: 0.0000% to 0.0050%

B contributes to the improvement of a texture with a small amount. Therefore, B may be contained. In a case of obtaining the above effect, the B content is set to preferably 0.0001% or more.

On the other hand, if the B content exceeds 0.0050%, the compound of B inhibits grain growth during annealing, making a grain size finer and causing an increase in iron loss. Therefore, the B content is set to 0.0050% or less.

O: 0.0000% to 0.0200%

O combines with Cr in steel to form $Cr_2O_3$. The $Cr_2O_3$ contributes to the improvement of a texture. Therefore, O may be contained. In a case of obtaining the above effect, the O content is set to preferably 0.0010% or more.

On the other hand, if the O content exceeds 0.0200%, $Cr_2O_3$ inhibits grain growth during annealing, making a grain size finer and causing an increase in iron loss. Therefore, the O content is set to 0.0200% or less.

A remainder of the chemical composition is Fe and impurities. The term "impurity" refers to a component that is contained in a raw material, or a component that is mixed in during a manufacturing process and is not intentionally contained in the steel sheet.

The chemical composition of the base steel sheet described above may be measured by a general analysis method. For example, the steel component may be measured using ICP-AES (Inductively Coupled Plasma-Atomic Emission Spectrometry). For C and S, the combustion-infrared absorption method may be used, and for N, the inert gas fusion-thermal conductivity method may be used. For O, the inert gas fusion-nondispersive infrared absorption method may be used.

In the first embodiment, a rotating electrical machine is manufactured using the rotor and the stator described above. In this way, both the stator and the rotor can have good magnetic characteristics, so that the efficiency of the motor can be improved.

A second embodiment of the present invention is a method for manufacturing a non-oriented electrical steel sheet for a rotor and a non-oriented electrical steel sheet for a stator that are used in the rotating electrical machine of the first embodiment. The relationship between the {111}<211> orientation intensities of the stator and the rotor of the rotating electrical machine of the first embodiment can also be obtained by controlling an annealing temperature for hot-rolled sheet annealing in the process of manufacturing the non-oriented electrical steel sheets that are used for the stator and the rotor.

That is, the relationship between the {111}<211> orientation intensities of the stator and the rotor of the rotating electrical machine of the first embodiment can be obtained by setting two types of annealing temperatures for the hot-rolled sheet annealing, setting an annealing temperature for hot-rolled sheet annealing of the non-oriented electrical steel sheet for the rotor to a temperature in a range of 860° C. to 1000° C., which is higher than an annealing temperature for hot-rolled sheet annealing of the non-oriented electrical steel sheet for the stator, when a non-oriented electrical steel sheet which includes, by mass %, C: 0.0100% or less, Si: 2.6% or more and 4.5% or less, Mn: 0.1% or more and 3.0% or less, P: 0.15% or less, S: 0.0030% or less, N: 0.0040% or less, Al: 0.1% or more and 2.0% or less, one or more selected from Sn and Sb: 0% to 0.200%, Cr: 0% to 5.0%, Ni: 0% to 5.0%, Cu: 0% to 5.0%, Ca: 0% to 0.010%, Mg: 0% to 0.0100%, a rare earth element (REM): 0% to 0.010%, Ti: 0.0030% or less, and a remainder consisting of Fe and impurities is manufactured by processes that include steelmaking, hot rolling, hot-rolled sheet annealing, pickling, cold rolling, and finish annealing. Therefore, a non-oriented electrical steel sheet set in which a {111}<211> orientation intensity (A) of the non-oriented electrical steel sheet for the stator is in a range of 2 to 30, {111}<211> orientation intensity (B) of the non-oriented electrical steel sheet for the rotor is in a range of 1 to 15, and both the orientation intensities satisfy the relationship of the expression (1) A>B is obtained.

The manufacturing method of the second embodiment of the present invention is performed by processes that include steelmaking, hot rolling, hot-rolled sheet annealing, pickling, cold rolling, finish annealing, and skin pass rolling which is performed as necessary, and although the steps other than the hot-rolled sheet annealing described above are not particularly specified, the following conditions can be adopted in each step.

A standard condition in a range of 1000° C. to 1200° C. may be used as a slab heating temperature for the hot rolling. However, a coiling temperature is preferably 600° C. or lower, and more preferably 550° C. or lower, from the viewpoint of the toughness of the hot-rolled sheet.

Since the thickness of the hot-rolled sheet is advantageously as thin as possible to prevent cracking or fracture during subsequent pickling passing or cold rolling passing, the thickness of the hot-rolled sheet can be appropriately adjusted in view of the toughness of the hot-rolled sheet, production efficiency, and the like.

From the viewpoint of magnetism, it is preferable that the hot-rolled sheet annealing is performed at a temperature of 800° C. or higher and 1100° C. or lower for 30 seconds or longer and a grain size before cold rolling grain-grow to a grain size in a range of about 50 to 300 μm. However, since the ductility of the hot-rolled sheet is lowered, it is favorable if the conditions are determined in consideration of the component and productivity.

In particular, as for the hot-rolled sheet annealing, two types of annealing temperatures may be set according to the required {111}<211> orientation intensity. The annealing temperature for the hot rolling annealing of the non-oriented electrical steel sheet for the rotor may be set to a temperature in a range of 860° C. to 1000° C., which may be higher than the annealing temperature for the hot-rolled sheet annealing of the non-oriented electrical steel sheet for the stator.

The annealing temperature for the hot-rolled sheet annealing is closely related to the {111}<211> orientation intensity of the resulting non-oriented electrical steel sheet. It is known that crystal grains of {111}<211> orientation are easily generated from the vicinity of the grain boundary before cold rolling. If the hot-rolled sheet annealing temperature is high, the grain boundary area before cold rolling decreases, and the crystal grains of {111}<211> orientation decrease in subsequent annealing. That is, by setting the annealing temperature for the hot-rolled sheet annealing of the non-oriented electrical steel sheet for the rotor to a temperature higher than the annealing temperature for the hot-rolled sheet annealing of the non-oriented electrical steel sheet for the stator, it is possible to obtain the relationship of the expression (1) A>B of the {111}<211> orientation intensities for both the rotor and the stator.

The annealing temperature range for the hot-rolled sheet annealing of the non-oriented electrical steel sheet for the rotor is a range of 860° C. to 1000° C. However, if the temperature is less than 860° C., since surface defects such as ridging occur, it is not preferable. Further, if the temperature exceeds 1000° C., since a steel sheet becomes brittle and the manufacturability is significantly impaired, it is not preferable. A particularly preferred range of the annealing temperature for the hot-rolled sheet annealing of the non-oriented electrical steel sheet for the rotor is a range of 900° C. to 950° C. On the other hand, the annealing temperature for the hot-rolled sheet annealing of the non-oriented electrical steel sheet for the stator may be lower than that of the non-oriented electrical steel sheet for the rotor.

The relationship between the {111}<211> orientation intensities of the stator and the rotor of the rotating electrical machine of the first embodiment can also be obtained by punching out a material that is used for the stator and a material that is used for the rotor from the non-oriented electrical steel sheets manufactured and obtained by the usual steps that include steelmaking, hot rolling, hot-rolled sheet annealing, pickling, cold rolling, and finish annealing, and stacking the materials, and thereafter, performing stress relief annealing only on the stator so as to satisfy the expression (1), even without controlling particularly the annealing temperature for the hot-rolled sheet annealing in the manufacturing process of the non-oriented electrical steel sheet that is used for the stator and the rotor described above.

As for the stress relief annealing that is performed only on the stator after punching, it is preferable to perform annealing at a temperature in a range of 700° C. to 900° C. for 120 minutes or longer in order to release punching strain. In a case where strain is imparted by skin pass rolling, it is particularly preferable to perform annealing at a higher temperature for a longer time. In this manner, by appropriately performing the stress relief annealing only on the stator, it is possible to obtain the relationship of the expression (1) A>B in the {111}<211> orientation intensity (A) of the stator and the {111}<211> orientation intensity (B) of the rotor after the stress relief annealing.

EXAMPLES

Hereinafter, the embodiments of the present invention will be further described using examples.

The conditions used in the examples are examples of the conditions for confirmation thereof, and the present invention is not limited to these examples, and various conditions can be adopted without departing from the present invention as long as the object of the present invention is achieved.

FIG. 1 is a partial plan view of a rotating electrical machine. A rotating electrical machine 300 is an IPM motor manufactured based on the D model of the Institute of Electrical Engineers of Japan. A stator core 3 has an outer diameter of 112 mm, a rotor 302 has an outer diameter of 54 mm, and a stacking height of the stator core 3 is 100 mm. The number of slots is 24 slots. The stator core 3 is fixed to a casing 301 by shrink-fitting. The outer diameter of the rotor 302 is 54 mmφ, the inner diameter of the stator core 3 is 55 mmφ, and the gap between the rotor 302 and the stator core 3 is 0.5 mm. Further, the stator core 3 has an outer diameter of 112 mmφ (=54 mm+0.5 mm×2+28.5 mm×2). The stator core has 24 slots, the number of windings per phase of a copper wire wound around a teeth portion of the stator core is 35 turns, and the magnetic flux density Br of a rotor magnet is 1.25 T.

In the present example, a loss generated in a rotating electrical machine when a winding current with a crest value of 3 A flowed at a phase angle of 30 degrees and the rotating electrical machine was driven at a rotation speed of 1500 RPM for 60 minutes was obtained as a motor loss (W).

Example 1

Molten steel was continuously cast to prepare a 250 mm thick slab having the chemical composition (a remainder is iron and impurities) shown in Table 1 below. Next, the slab was subjected to hot rolling to create a hot-rolled sheet. A slab reheating temperature at that time was 1200° C., a finish temperature in finish rolling was 850° C., a coiling temperature at the time of coiling was 650° C., and a finished sheet thickness was 2.0 mm. Next, in the hot-rolled sheet, as the hot-rolled sheet annealing, annealing was performed at the temperatures shown in Table 1 for 1 minute, scale was removed by pickling, and cold rolling was performed to a thickness of 0.35 mm. Then, finish annealing was performed at 800° C. for 30 seconds.

Next, an iron loss W15/50 (iron loss at maximum magnetic flux density of 1.5 T and a frequency of 50 Hz) of a magnetic characteristic was measured. A test piece of 55 mm square was taken as a measurement sample, and the average value of the characteristics in a rolling direction and a width direction was obtained. The magnetic measurement was performed using a device capable of measuring the test piece of 55 mm square or a smaller test piece according to the electromagnetic circuit described in JIS C 2556 (2015). The measurement results are shown in Table 1. Further, the {111}<211> orientation intensity of the material was measured. The measurement method was the method described above.

As the material used for each of the stator and the rotor of the rotating electrical machine, each material of A to Z shown in Table 1, and each material of A' to Z' having the same composition and the same iron loss as the materials A to Z and having low {111}<211> orientation intensity were prepared. The annealing temperature for the hot rolling annealing of each of the materials of A' to Z' was set to be higher than the annealing temperature of each of the materials of A to Z.

The cores of the stator and the rotor were created from these materials, and a rotating electrical machine (motor) was created. The materials used for the stator and the rotor, the establishment or non-establishment of the expression (1), and the motor losses are shown in Table 2. Rotating electrical machines 103, 106, 109, 112, 115, 118, 121, 124, 127, 130, 133, 136, 139, 142, 145, 148, 151, 154, 157, 160, 163, 166, 172, and 175, which are invention examples, were lower in motor loss than other rotating electrical machines (comparative examples) using the same core material. Although the rotating electrical machine 169 satisfied the expression (1), the {111}<211> range of the material used for the rotor was out of the range of the present invention, so that the motor loss was bad.

TABLE 1A

| Material No. | C mass % | Si mass % | Mn mass % | Al mass % | P mass % | S mass % | N mass % | Sn mass % | Sb mass % | Cr mass % | Ni mass % | Cu mass % | Ca mass % |
|---|---|---|---|---|---|---|---|---|---|---|---|---|---|
| A |
| A  | 0.0019 | 2.71 | 0.2 | 0.31 | 0.01 | 0.0019 | — | — | — | 0.002 | — | — | — |
| A' |
| B  | 0.002  | 4.41 | 0.2  | 0.3  | 0.012 | 0.002  | — | — | — | 0.002 | — | — | — |
| B' |
| C  | 0.0021 | 2.71 | 0.18 | 1.88 | 0.01  | 0.002  | — | — | — | 0.002 | — | — | — |
| C' |
| D  | 0.0019 | 3.52 | 2.9  | 1.5  | 0.008 | 0.0021 | — | — | — | 0.002 | — | — | — |
| D' |
| E  | 0.0097 | 3.21 | 0.22 | 0.26 | 0.011 | 0.0017 | — | — | — | — | — | — | — |
| E' |
| F  | 0.0020 | 3.22 | 0.10 | 0.28 | 0.010 | 0.0018 | — | — | — | — | — | — | — |
| F' |
| G  | 0.0021 | 3.22 | 0.21 | 0.28 | 0.145 | 0.0019 | — | — | — | — | — | — | — |
| G' |
| H  | 0.0020 | 3.21 | 0.21 | 0.28 | 0.008 | 0.0026 | — | — | — | — | — | — | — |
| H' |
| I  | 0.0021 | 3.19 | 0.22 | 0.28 | 0.010 | 0.0017 | 0.0035 | — | — | — | — | — | — |
| I' |
| B |
| J  | 0.0019 | 3.21 | 0.21 | 0.13 | 0.012 | 0.0017 | — | — | — | — | — | — | — |
| J' |
| K  | 0.0021 | 3.20 | 0.21 | 0.29 | 0.010 | 0.0017 | — | 0.195 | — | — | — | — | — |
| K' |
| L  | 0.0019 | 3.22 | 0.22 | 0.29 | 0.011 | 0.0018 | — | — | 0.196 | — | — | — | — |
| L' |
| M  | 0.0022 | 3.18 | 0.18 | 0.29 | 0.012 | 0.0015 | — | — | — | 0.35 | — | — | — |
| M' |

TABLE 1A-continued

| Material No. | | | | | | | | | | | | | |
|---|---|---|---|---|---|---|---|---|---|---|---|---|---|
| N<br>N' | 0.0020 | 3.21 | 0.22 | 0.27 | 0.009 | 0.0015 | — | — | — | — | 4.67 | — | — |
| O<br>O' | 0.0021 | 3.20 | 0.19 | 0.27 | 0.012 | 0.0015 | — | — | — | — | — | 4.67 | — |
| P<br>P' | 0.0019 | 3.19 | 0.20 | 0.30 | 0.010 | 0.0017 | — | — | — | — | — | — | 0.0095 |
| Q<br>Q' | 0.0021 | 3.19 | 0.22 | 0.27 | 0.010 | 0.0016 | — | — | — | — | — | — | — |
| R<br>R' | 0.0020 | 3.20 | 0.20 | 0.26 | 0.009 | 0.0015 | — | — | — | — | — | — | — |
| C | | | | | | | | | | | | | |
| S<br>S' | 0.0019 | 3.21 | 0.20 | 0.28 | 0.010 | 0.0018 | — | — | — | — | — | — | — |
| T<br>T' | 0.0021 | 3.21 | 0.19 | 0.27 | 0.011 | 0.0018 | — | — | — | — | — | — | — |
| U<br>U' | 0.0020 | 3.19 | 0.22 | 0.26 | 0.008 | 0.0018 | — | — | — | — | — | — | — |
| V<br>V' | 0.0020 | 3.21 | 0.21 | 0.26 | 0.011 | 0:0017 | — | — | — | 0.015 | — | — | — |
| W<br>W' | 0.0019 | 6.51 | 2.48 | 1.48 | 0.011 | 0.0017 | — | — | — | — | — | — | — |
| X<br>X' | 0.0021 | 3.19 | 0.19 | 0.28 | 0.011 | 0.0016 | — | — | — | — | — | — | — |
| Y<br>Y' | 0.0019 | 3.21 | 0.19 | 0.28 | 0.009 | 0.0019 | — | — | — | — | — | — | — |
| Z<br>Z' | 0.0022 | 3.19 | 0.19 | 0.30 | 0.009 | 0.0019 | — | — | — | — | — | — | — |

| Material No. | REM mass % | Mg mass % | Ti mass % | B mass % | O mass % | Hot rolled sheet annealing temperature °C. | {111}<211> orientation intensity I/I0 | {411}<148> orientation intensity I/I0 | W15/50 W/kg |
|---|---|---|---|---|---|---|---|---|---|
| A | | | | | | | | | |
| A | — | — | — | — | — | 850 | 14.9 | 2.1 | 9.1 |
| A' | — | — | — | — | — | 1000 | 3.9 | 3.5 | 9.1 |
| B | — | — | — | — | — | 850 | 16.2 | 2.3 | 8.7 |
| B' | — | — | — | — | — | 1000 | 5.1 | 3.6 | 8.7 |
| C | — | — | — | — | — | 850 | 15.4 | 2.2 | 8.9 |
| C' | — | — | — | — | — | 1000 | 4.3 | 3.4 | 8.9 |
| D | — | — | — | — | — | 850 | 17.1 | 2.2 | 8.4 |
| D' | — | — | — | — | — | 1000 | 5.5 | 3.5 | 8.4 |
| E | — | — | — | — | — | 850 | 12.3 | 2.1 | 9.4 |
| E' | — | — | — | — | — | 1000 | 4.6 | 3.3 | 9.4 |
| F | — | — | — | — | — | 850 | 12.4 | 2.6 | 9.2 |
| F' | — | — | — | — | — | 1000 | 4.1 | 3.5 | 9.2 |
| G | — | — | — | — | — | 850 | 12.2 | 2.4 | 8.8 |
| G' | — | — | — | — | — | 1000 | 4.2 | 3.5 | 8.8 |
| H | — | — | — | — | — | 850 | 12.4 | 2.1 | 9.3 |
| H' | — | — | — | — | — | 1000 | 4.3 | 3.6 | 9.3 |
| I | — | — | — | — | — | 850 | 12.0 | 2.1 | 9.3 |
| I' | — | — | — | — | — | 1000 | 4.3 | 3.5 | 9.3 |
| B | | | | | | | | | |
| J | — | — | — | — | — | 850 | 12.1 | 2.5 | 9.2 |
| J' | — | — | — | — | — | 1000 | 4.3 | 3.5 | 9.2 |
| K | — | — | — | — | — | 850 | 10.5 | 2.4 | 8.8 |
| K' | — | — | — | — | — | 1000 | 2.4 | 3.5 | 8.8 |
| L | — | — | — | — | — | 850 | 10.2 | 2.2 | 8.8 |
| L' | — | — | — | — | — | 1000 | 2.5 | 3.7 | 8.8 |
| M | — | — | — | — | — | 850 | 10.7 | 2.4 | 8.8 |
| M' | — | — | — | — | — | 1000 | 2.4 | 3.8 | 8.8 |
| N | — | — | — | — | — | 850 | 10.4 | 2.7 | 8.8 |
| N' | — | — | — | — | — | 1000 | 2.4 | 3.2 | 8.8 |
| O | — | — | — | — | — | 850 | 10.5 | 2.3 | 8.8 |
| O' | — | — | — | — | — | 1000 | 2.5 | 3.3 | 8.8 |
| P | — | — | — | — | — | 850 | 12.2 | 2.6 | 8.8 |
| P' | — | — | — | — | — | 1000 | 4.3 | 3.4 | 8.8 |
| Q | 0.0097 | — | — | — | — | 850 | 11.9 | 2.5 | 8.8 |
| Q' | | | | | | 1000 | 4.2 | 3.5 | 8.8 |
| R | — | 0.0095 | — | — | — | 850 | 12.2 | 2.3 | 8.8 |
| R' | | | | | | 1000 | 4.2 | 3.4 | 8.8 |
| C | | | | | | | | | |
| S | — | — | 0.0026 | — | — | 850 | 12.1 | 2.2 | 9.3 |
| S' | | | | | | 1000 | 4.2 | 3.5 | 9.3 |
| T | — | — | — | 0.0045 | — | 850 | 12.2 | 2.5 | 8.9 |

TABLE 1A-continued

| | | | | | | | | | |
|---|---|---|---|---|---|---|---|---|---|
| T' | | | | | | 1000 | 4.0 | 3.6 | 8.9 |
| U | — | — | — | — | 0.0193 | 850 | 12.1 | 2.4 | 9.3 |
| U' | | | | | | 1000 | 4.2 | 3.7 | 9.3 |
| V | — | — | — | — | 0.0050 | 850 | 12.3 | 2.6 | 9.3 |
| V' | | | | | | 1000 | 4.3 | 3.3 | 9.3 |
| W | — | — | — | — | — | 850 | 18.2 | 2.7 | 8.4 |
| W' | | | | | | 1000 | 16.6 | 3.4 | 8.4 |
| X | — | — | — | — | — | 800 | 16.4 | 2.4 | 10.1 |
| X' | | | | | | 850 | 12.4 | 3.6 | 10.1 |
| Y | — | — | — | — | — | 500 | 14.2 | 4.6 | 9.1 |
| Y' | | | | | | 550 | 6.1 | 4.8 | 9.1 |
| Z | — | — | — | — | — | 600 | 31.6 | 2.1 | 13.1 |
| Z' | | | | | | 660 | 15.3 | 3.9 | 13.1 |

TABLE 2A

| Motor No. | Material used for stator | Material used for rotor | Expression (1) | Motor loss (W) | Remarks |
|---|---|---|---|---|---|
| Motor 101 | A | A | Non-established | 47.9 | Comparative Example |
| Motor 102 | A' | A | Non-established | 48.1 | Comparative Example |
| Motor 103 | A | A' | Established | 46.1 | Invention Example |
| Motor 104 | B | B | Non-established | 45.8 | Comparative Example |
| Motor 105 | B' | B | Non-established | 46.1 | Comparative Example |
| Motor 106 | B | B' | Established | 44.4 | Invention Example |
| Motor 107 | C | C | Non-established | 46.7 | Comparative Example |
| Motor 108 | C' | C | Non-established | 46.9 | Comparative Example |
| Motor 109 | C | C' | Established. | 44.9 | Invention Example |
| Motor 110 | D | D | Non-established | 44.8 | Comparative Example |
| Motor 111 | D' | D | Non-established | 45.1 | Comparative Example |
| Motor 112 | D | D' | Established | 42.1 | Invention Example |
| Motor 113 | E | E | Non-established | 49.9 | Comparative Example |
| Motor 114 | E' | E | Non-established | 50.3 | Comparative Example |
| Motor 115 | E | E' | Established | 47.3 | Invention Example |
| Motor 116 | F | F | Non-established | 48.7 | Comparative Example |
| Motor 117 | F' | F | Non-established | 48.9 | Comparative Example |
| Motor 118 | F | F' | Established | 46.1 | Invention Example |
| Motor 119 | G | G | Non-established | 46.5 | Comparative Example |
| Motor 120 | G' | G | Non-established | 46.8 | Comparative Example |
| Motor 121 | G | G' | Established | 44.2 | Invention Example |
| Motor 122 | H | H | Non-established | 49.5 | Comparative Example |
| Motor 123 | H' | H | Non-established | 49.7 | Comparative Example |
| Motor 124 | H | H' | Established | 46.7 | Invention Example |
| Motor 125 | I | I | Non-established | 49.3 | Comparative Example |
| Motor 126 | I' | I | Non-established | 49.8 | Comparative Example |
| Motor 127 | I | I' | Established | 46.5 | Invention Example |

Example 2

As shown in Table 3, the same materials A' to Z' as those used in Example 1 were prepared for the stator and the rotor of the rotating electrical machine. Core materials were punched out from these materials, and then stress relief annealing was performed under the conditions shown in Table 3. At this time, the stress relief annealing was performed at 800° C. for 2 hours. The {111}<211> orientation intensity of the material and the motor loss were obtained in the same manner as in Example 1. Rotating electrical machines 203, 206, 209, 212, 215, 218, 221, 224, 227, 230, 233, 236, 239, 242, 245, 248, 251, 254, 257, 260, 263, 266, 272, and 275, which are invention examples, were lower in motor loss than other rotating electrical machines (comparative examples) using the same core material. Although the rotating electrical machine 269 satisfied the expression (1), the {111}<211> range of the material used for the rotor was out of the range of the present invention, so that the motor loss was bad.

TABLE 3A

| | Stator | | | | Rotor | | | | | |
|---|---|---|---|---|---|---|---|---|---|---|
| Motor No. | Material | Stress relief annealing | {111}<211> orientation intensity (I/I0) | {411}<148> orientation intensity (I/I0) | Material | Stress relief annealing | {111}<211> orientation intensity (I/I0) | {411}<148> orientation intensity (I/I0) | Expression (1) | Motor loss (W) | Remarks |
| A | | | | | | | | | | | |
| Motor 201 | A' | Without | 3.9 | 3.5 | A' | Without | 3.9 | 3.5 | Non-established | 47.9 | Comparative Example |

TABLE 3A-continued

|  |  | Stator | | | | Rotor | | | |  |  |
| --- | --- | --- | --- | --- | --- | --- | --- | --- | --- | --- | --- |
| Motor No. | Material | Stress relief annealing | {111}<211> orientation intensity (I/I0) | {411}<148> orientation intensity (I/I0) | Material | Stress relief annealing | {111}<211> orientation intensity (I/I0) | {411}<148> orientation intensity (I/I0) | Expression (1) | Motor loss (W) | Remarks |
| Motor 202 | A' | Without | 3.9 | 3.5 | A' | With | 4.6 | 4.1 | Non-established | 30.2 | Comparative Example |
| Motor 203 | A' | With | 4.6 | 4.1 | A' | Without | 3.9 | 3.5 | Established | 28.7 | Invention Example |
| Motor 204 | B' | Without | 5.1 | 3.6 | B' | Without | 5.1 | 3.6 | Non-established | 45.8 | Comparative Example |
| Motor 205 | B' | Without | 5.1 | 3.6 | B' | With | 6.2 | 4.2 | Non-established | 29.1 | Comparative Example |
| Motor 206 | B' | With | 6.2 | 4.2 | B' | Without | 5.1 | 3.6 | Established | 29 | Invention Example |
| Motor 207 | C' | Without | 4.3 | 3.4 | C' | Without | 4.3 | 3.4 | Non-established | 46.7 | Comparative Example |
| Motor 208 | C' | Without | 4.3 | 3.4 | C' | With | 4.9 | 4.0 | Non-established | 30 | Comparative Example |
| Motor 209 | C' | With | 4.9 | 4.0 | C' | Without | 4.3 | 3.4 | Established | 28.8 | Invention Example |
| Motor 210 | D' | Without | 5.5 | 3.5 | D' | Without | 5.5 | 3.5 | Non-established | 44.8 | Comparative Example |
| Motor 211 | D' | Without | 5.5 | 3.5 | D' | With | 6.6 | 4.1 | Non-established | 26.9 | Comparative Example |
| Motor 212 | D' | With | 6.6 | 4.1 | D' | Without | 5.5 | 3.5 | Established | 25.8 | Invention Example |
| Motor 213 | E' | Without | 4.6 | 3.3 | E' | Without | 4.6 | 3.3 | Non-established | 49.9 | Comparative Example |
| Motor 214 | E' | Without | 4.6 | 3.3 | E' | With | 5.6 | 3.9 | Non-established | 31.8 | Comparative Example |
| Motor 215 | E' | With | 5.6 | 3.9 | E' | Without | 4.6 | 3.3 | Established | 29.8 | Invention Example |
| Motor 216 | F' | Without | 4.1 | 3.5 | F' | Without | 4.1 | 3.5 | Non-established | 48.8 | Comparative Example |
| Motor 217 | F' | Without | 4.1 | 3.5 | F' | With | 4.7 | 4.1 | Non-established | 30.7 | Comparative Example |
| Motor 218 | F' | With | 4.7 | 4.1 | F' | Without | 4.1 | 3.5 | Established | 28.6 | Invention Example |
| Motor 219 | G' | Without | 4.2 | 3.5 | G' | Without | 4.2 | 3.5 | Non-established | 46.6 | Comparative Example |
| Motor 220 | G' | Without | 4.2 | 3.5 | G' | With | 5.3 | 4.1 | Non-established | 28.6 | Comparative Example |
| Motor 221 | G' | With | 5.3 | 4.1 | G' | Without | 4.2 | 3.5 | Established | 26.7 | Invention Example |
| Motor 222 | H' | Without | 4.3 | 3.6 | H' | Without | 4.3 | 3.6 | Non-established | 49.2 | Comparative Example |
| Motor 223 | H' | Without | 4.3 | 3.6 | H' | With | 5.4 | 4.2 | Non-established | 31.3 | Comparative Example |
| Motor 224 | H' | With | 5.4 | 4.2 | H' | Without | 4.3 | 3.6 | Established | 29.5 | Invention Example |
| Motor 225 | I' | Without | 4.3 | 3.5 | I' | Without | 4.3 | 3.5 | Non-established | 49.4 | Comparative Example |
| Motor 226 | I' | Without | 4.3 | 3.5 | I' | With | 5.4 | 4.1 | Non-established | 31.5 | Comparative Example |
| Motor 227 | I' | With | 5.4 | 4.1 | I' | Without | 4.3 | 3.5 | Established | 29.2 | Invention Example |
| B | | | | | | | | | | | |
| Motor 228 | J' | Without | 4.3 | 3.5 | J' | Without | 4.3 | 3.5 | Non-established | 48.6 | Comparative Example |
| Motor 229 | J' | Without | 4.3 | 3.5 | J' | With | 4.7 | 4.2 | Non-established | 30.7 | Comparative Example |
| Motor 230 | J' | With | 4.7 | 4.2 | J' | Without | 4.3 | 3.5 | Established | 28.8 | Invention Example |
| Motor 231 | K' | Without | 2.4 | 3.5 | K' | Without | 2.4 | 3.5 | Non-established | 46.5 | Comparative Example |
| Motor 232 | K' | Without | 2.4 | 3.5 | K' | With | 4.7 | 4.1 | Non-established | 28.6 | Comparative Example |
| Motor 233 | K' | With | 4.7 | 4.1 | K' | Without | 2.4 | 3.5 | Established | 26.8 | Invention Example |
| Motor 234 | L' | Without | 2.5 | 3.7 | L' | Without | 2.5 | 3.7 | Non-established | 46.5 | Comparative Example |
| Motor 235 | L' | Without | 2.5 | 3.7 | L' | With | 4.7 | 4.4 | Non-established | 28.5 | Comparative Example |
| Motor 236 | L' | With | 4.7 | 4.4 | L' | Without | 2.5 | 3.7 | Established | 26.6 | Invention Example |

TABLE 3A-continued

| | | Stator | | | | Rotor | | | | | |
|---|---|---|---|---|---|---|---|---|---|---|---|
| Motor No. | Material | Stress relief annealing | {111}<211> orientation intensity (I/I0) | {411}<148> orientation intensity (I/I0) | Material | Stress relief annealing | {111}<211> orientation intensity (I/I0) | {411}<148> orientation intensity (I/I0) | Expression (1) | Motor loss (W) | Remarks |
| Motor 237 | M' | Without | 2.4 | 3.8 | M' | Without | 2.4 | 3.8 | Non-established | 46.6 | Comparative Example |
| Motor 238 | M' | Without | 2.4 | 3.8 | M' | With | 3.5 | 4.4 | Non-established | 28.7 | Comparative Example |
| Motor 239 | M' | With | 3.5 | 4.4 | M' | Without | 2.4 | 3.8 | Established | 26.5 | Invention Example |
| Motor 240 | N' | Without | 2.4 | 3.2 | N' | Without | 2.4 | 3.2 | Non-established | 46.6 | Comparative Example |
| Motor 241 | N' | Without | 2.4 | 3.2 | N' | With | 3.5 | 3.8 | Non-established | 28.6 | Comparative Example |
| Motor 242 | N' | With | 3.5 | 3.8 | N' | Without | 2.4 | 3.2 | Established | 26.6 | Invention Example |
| Motor 243 | O' | Without | 2.5 | 3.3 | O' | Without | 2.5 | 3.3 | Non-established | 46.5 | Comparative Example |
| Motor 244 | O' | Without | 2.5 | 3.3 | O' | With | 3.6 | 3.9 | Non-established | 28.6 | Comparative Example |
| Motor 245 | O' | With | 3.6 | 3.9 | O' | Without | 2.5 | 3.3 | Established | 26.5 | Invention Example |
| Motor 246 | P' | Without | 4.3 | 3.4 | P' | Without | 4.3 | 3.4 | Non-established | 46.5 | Comparative Example |
| Motor 247 | P' | Without | 4.3 | 3.4 | P' | With | 5.4 | 4.0 | Non-established | 28.4 | Comparative Example |
| Motor 248 | P' | With | 5.4 | 4.0 | P' | Without | 4.3 | 3.4 | Established | 26.6 | Invention Example |
| Motor 249 | Q' | Without | 4.2 | 3.5 | Q' | Without | 4.2 | 3.5 | Non-established | 46.8 | Comparative Example |
| Motor 250 | Q' | Without | 4.2 | 3.5 | Q' | With | 5.3 | 4.1 | Non-established | 28.8 | Comparative Example |
| Motor 251 | Q' | With | 5.3 | 4.1 | Q' | Without | 4.2 | 3.5 | Established | 26.4 | Invention Example |
| | | | | | C | | | | | | |
| Motor 252 | R' | Without | 4.2 | 3.4 | R' | Without | 4.2 | 3.4 | Non-established | 46.7 | Comparative Example |
| Motor 253 | R' | Without | 4.2 | 3.4 | R' | With | 5.3 | 4.1 | Non-established | 28.7 | Comparative Example |
| Motor 254 | R' | With | 5.3 | 4.1 | R' | Without | 4.2 | 3.4 | Established | 26.5 | Invention Example |
| Motor 255 | S' | Without | 4.2 | 3.5 | S' | Without | 4.2 | 3.5 | Non-established | 49.2 | Comparative Example |
| Motor 256 | S' | Without | 4.2 | 3.5 | S' | With | 5.3 | 4.2 | Non-established | 31.4 | Comparative Example |
| Motor 257 | S' | With | 5.3 | 4.2 | S' | Without | 4.2 | 3.5 | Established | 29.2 | Invention Example |
| Motor 258 | T' | Without | 4.0 | 3.6 | T' | Without | 4.0 | 3.6 | Non-established | 47.4 | Comparative Example |
| Motor 259 | T' | Without | 4.0 | 3.6 | T' | With | 5.1 | 4.2 | Non-established | 29.0 | Comparative Example |
| Motor 260 | T' | With | 5.1 | 4.2 | T' | Without | 4.0 | 3.6 | Established | 27.3 | Invention Example |
| Motor 261 | U' | Without | 4.2 | 3.7 | U' | Without | 4.2 | 3.7 | Non-established | 49.1 | Comparative Example |
| Motor 262 | U' | Without | 4.2 | 3.7 | U' | With | 5.3 | 4.3 | Non-established | 31.4 | Comparative Example |
| Motor 263 | U' | With | 5.3 | 4.3 | U' | Without | 4.2 | 3.7 | Established | 29.4 | Invention Example |
| Motor 264 | V' | Without | 4.3 | 3.3 | V' | Without | 4.3 | 3.3 | Non-established | 49.2 | Comparative Example |
| Motor 265 | V' | Without | 4.3 | 3.3 | V' | With | 5.4 | 3.9 | Non-established | 31.4 | Comparative Example |
| Motor 266 | V' | With | 5.4 | 3.9 | V' | Without | 4.3 | 3.3 | Established | 29.1 | Invention Example |
| Motor 267 | W' | Without | 16.6 | 3.4 | W' | Without | 16.6 | 3.4 | Non-established | 68.2 | Comparative Example |
| Motor 268 | W' | Without | 16.6 | 3.4 | W' | With | 17.8 | 4.1 | Non-established | 48.2 | Comparative Example |
| Motor 269 | W' | With | 17.8 | 4.1 | W' | Without | 16.6 | 3.4 | Non-established | 48.1 | Comparative Example |
| Motor 270 | X' | Without | 12.4 | 3.6 | X' | Without | 12.4 | 3.6 | Non-established | 47.1 | Comparative Example |
| Motor 271 | X' | Without | 12.4 | 3.6 | X' | With | 13.6 | 4.2 | Non-established | 29.2 | Comparative Example |

TABLE 3A-continued

| | | Stator | | | | Rotor | | | | | |
|---|---|---|---|---|---|---|---|---|---|---|---|
| Motor No. | Material | Stress relief annealing | {111}<211> orientation intensity (I/I0) | {411}<148> orientation intensity (I/I0) | Material | Stress relief annealing | {111}<211> orientation intensity (I/I0) | {411}<148> orientation intensity (I/I0) | Expression (1) | Motor loss (W) | Remarks |
| Motor 272 | X' | With | 13.6 | 4.2 | X' | Without | 12.4 | 3.6 | Established | 27.5 | Invention Example |
| Motor 273 | Y' | Without | 6.1 | 4.8 | Y' | Without | 6.1 | 4.8 | Non-established | 57.5 | Comparative Example |
| Motor 274 | Y' | Without | 6.1 | 4.8 | Y' | With | 6.6 | 5.4 | Non-established | 32.1 | Comparative Example |
| Motor 275 | Y' | With | 6.6 | 5.4 | Y' | Without | 6.1 | 4.8 | Established | 30.2 | Invention Example |

INDUSTRIAL APPLICABILITY

In the present invention, both the stator and the rotor can have good magnetic characteristics, so that the efficiency of the motor can be improved, and therefore, industrial applicability is extremely high.

What is claimed is:

1. A rotating electrical machine comprising:
   a stator;
   a rotor; and
   a casing that accommodates the stator and the rotor,
   wherein a {111}<211> orientation intensity (A) of a core material of the stator is in a range of 2 to 30, a {111}<211> orientation intensity (B) of a core material of the rotor is in a range of 1 to 15, and both the orientation intensities satisfy a relationship of an expression (1) A>B.

2. The rotating electrical machine according to claim 1, wherein a {411}<148> orientation intensity (C) of the core material of the rotor is less than 4.

3. The rotating electrical machine according to claim 1, wherein a chemical composition of each of a core of the stator and a core of the rotor includes, by mass %, C: 0.0100% or less, Si: 2.6% or more and 4.5% or less, Mn: 0.10% or more and 3.00% or less, P: 0.15% or less, S: 0.0030% or less, N: 0.0040% or less, Al: 0.10% or more and 2.00% or less, one or more selected from Sn and Sb: 0% to 0.200%, Cr: 0% to 5.0%, Ni: 0% to 5.0%, Cu: 0% to 5.0%, Ca: 0% to 0.010%, Mg: 0% to 0.0100%, a rare earth element (REM): 0% to 0.010%, Ti: 0.0030% or less, B: 0.0000% to 0.0050%, O: 0.0000% to 0.0200%, and a remainder of Fe and impurities.

* * * * *